Feb. 28, 1956  N. W. ROOP  2,736,129
MOLDED FLY SWATTER
Filed May 2, 1952
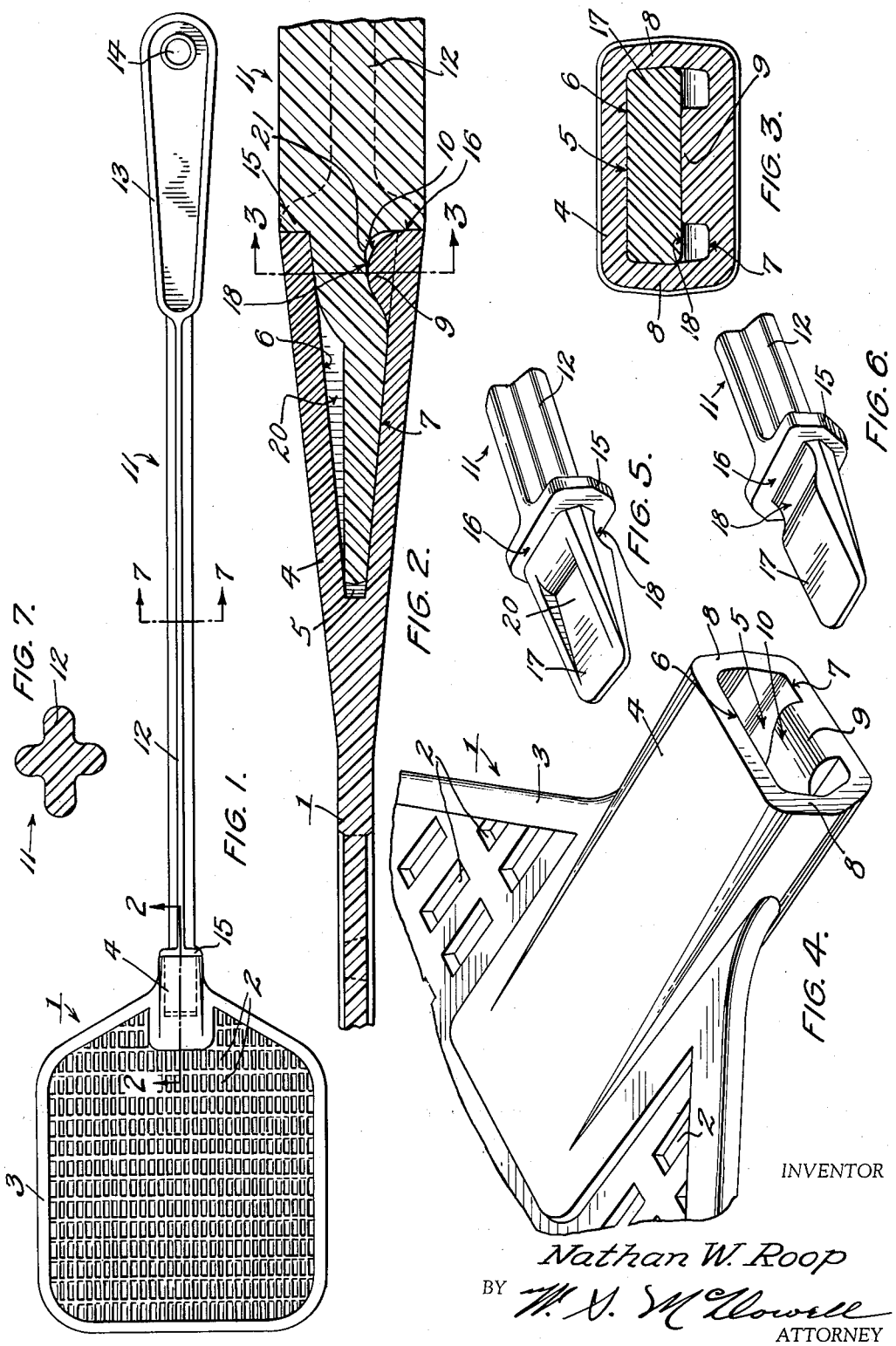
INVENTOR
Nathan W. Roop
BY W. N. McDowell
ATTORNEY

United States Patent Office 2,736,129
Patented Feb. 28, 1956

2,736,129

MOLDED FLY SWATTER

Nathan W. Roop, Columbus, Ohio, assignor to Columbus Plastic Products, Inc., Columbus, Ohio, a corporation of Ohio Application May 2, 1952, Serial No. 285,630

2 Claims. (Cl. 43—137)

This invention relates to portable hand-wielded tools or appliances, particularly appliances of the type in which separable handle and body members are found. Among such tools or appliances are insect-destroying devices of the kind known conventionally as fly swatters. This invention is concerned with the construction of an improved fly swatter, although, as will be later understood, it is not limited to appliances of such a specific category.

An object of the invention is to provide a portable hand-wielded appliance having separable handle and body members, and wherein each of said members comprises a unitary one-piece product of molded composition materials, the complete appliance being composed of but two molded parts.

Another object of the invention is to provide a wholly molded appliance in which improved means are provided for detachably connecting handle and body members in relatively secured operative order.

A further object is to provide a fly swatter having separable handle and blade members formed wholly from molded synthetic resin materials.

A still further object is to provide a fly swatter comprising molded handle and blade members and wherein the blade member is composed of a relatively soft flexible plastic, such as polyethylene or vinylite, and wherein the separably united handle member is composed of a relatively hard and inflexible resin, such as polystyrene.

Still another object of the invention is to provide a fly swatter of the character indicated having a blade member, which is composed of a relatively resilient flexible plastic, and which includes a sheathing formation containing a substantially wedge-shaped socket, and wherein an elongated handle member is provided which is formed at its forward end with a substantially wedge-shaped tongue extension arranged to be received within the blade sheathing socket, one of the surfaces of the tongue being provided with a groove or depression in which a hump-forming region of the socket wall is received, the arrangement being such as to provide a fly swatter composed of but two molded parts and wherein improved means, provided by the tongue and socket construction, is utilized in separably uniting said members.

For a further understanding of the invention, reference is to be had to the following description and the accompanying drawings, wherein:

Fig. 1 is a top plan view of a molded fly swatter formed in accordance with the present invention;

Fig. 2 is an enlarged vertical longitudinal sectional view taken on the plane indicated by the line 2—2 of Fig. 1, and illustrating more particularly the interfitting tongue and socket construction employed in uniting the blade and handle members of the appliance in secured relation;

Fig. 3 is a transverse sectional view taken on the plane indicated by the line 3—3 of Fig. 2;

Fig. 4 is an enlarged detail perspective view of the blade member of the appliance and illustrating on a larger scale the construction of the tongue-receiving socket of the blade member;

Fig. 5 is a detail fragmentary perspective view of the forwardly disposed tongue construction forming an integral molded part of the appliance handle;

Fig. 6 is a similar view of the handle but looking toward the under part of the handle tongue with respect to the position of the tongue disclosed in Fig. 5;

Fig. 7 is a vertical transverse sectional view on the line 7—7 of Fig. 1.

Referring more particularly to the drawing, 1 designates the blade or body member of a hand-wielded tool or appliance which, as shown in the drawings, is adapted for use as a fly swatter.

The blade member comprises in this instance a substantially rectangular body molded from a synthetic resin, preferably polystyrene or vinylite, so that when completed the blade member is relatively resilient and flexible. The body of the blade member is provided with a multiplicity of openings or slots 2, and possesses a reenforcing outer marginal rib 3.

In this instance, the blade member is molded to provide a sheathing formation 4 in which is formed a handle-receiving substantially wedge-shaped socket 5. The sheathing is disposed on the longitudinal axis of the blade member at the rear thereof and constitutes an integral molded part of the blade member. The socket produced by the sheathing, as developed more particularly in Fig. 2, is of wedge-shaped configuration, open at its rear end and formed with forwardly converging top and bottom walls 6 and 7, respectively, the side walls 8—8 presenting surfaces substantially perpendicular to those of the walls 6 and 7. The bottom wall 7 is formed centrally with a molded lug or hump 9 having a convex upper surface 10, the lug or hump constituting a locking or fastening element by which the handle member 11 of the appliance is held in secure operative association with the blade member.

The handle member 11 is also of molded one-piece composition. Preferably, the same when molded comprises a relatively hard, stiff and unyielding plastic and, if desired, the same may be composed of a synthetic resin, such as one having the properties of polystyrene.

The handle member includes a shank 12 which, for reasons of rigidity and strength, may possess the transverse cross-shaped configuration illustrated in Fig. 7. The rear end of the shank 12 terminates in an integral hand-gripping section 13 which may be perforated as at 14 so that the device may be suspended from a wall-mounted hook, or the like, when not in use.

The forward end of the shank 12 terminates in a laterally projecting flange 15, presenting flat shoulder-forming surfaces 16. Beyond the flange 15 the handle member is shaped to provide a wedge-shaped extension or tongue 17, which is proportioned so that it may be snugly received within the socket 5 of the blade member. In fact, the proportions of the parts may be such that the relatively yieldable walls of the sheathing 4 stretch or yield somewhat as the tongue 17 is forced into the socket against resistance offered by the stretching walls.

In accordance with the present invention, one of the surfaces of the tongue 17, in this instance its under surface, is provided with a groove or depression 18. When the tongue extension is fully forced into its operative position within the socket, and with the shoulder-forming surfaces 16 of the flange 15 in contact with the vertical edge surfaces of the sheathing 4, the lug or hump 9 of the sheathing 4 resiliently enters the groove or depression 18 of the tongue extension, so that the latter will be positively held in the socket and accidental longitudinal separation of the tongue and handle members prevented. In separating the members, it is necessary to apply sufficient pulling force in opposite directions to the respective members of the tool so that the walls of the socket will flex sufficiently to enable the curved surfaces of the groove or depression 18 to pass over the corresponding surfaces of the convex lug or hump 9. Normally, the forces necessary in effecting said separation are greatly in excess of those applied to the blade portion of the tool during its normal use, so that accidental separation of the members in normal use of the tool will not be likely to take place.

It will be noted that the upper surface of the wedge-shaped tongue extension 17, as the construction is viewed in Figs. 2 and 5 of the drawing, at a position slightly forwardly of the lug-receiving groove or recess 18, is provided with a second depressed region or recess, as at 20. Also, a portion of the lug-receiving recess or groove 18, provided in the lower surface of the tongue extension, is formed so that it possesses a curvature different from that of the corresponding portion of the lug 9. This is done in order that there may remain a space 21 between the lug and tongue extension, since the recessed or depressed region 20 and the space 21 by being thus arranged serve to facilitate separation of the handle member 11 from the sheathing 4.

In view of the foregoing, it will be seen that the present invention provides a fly swatter, or the like, consisting of but two members. Both these members are of molded synthetic resin composition, and are in this instance provided with improved means for detachably securing the same in operative association. The device is strong and sturdy in its mechanical design, inexpensive in construction and possesses an extended life when used in its customary capacity.

While I have described in detail a single preferred embodiment of the appliance, nevertheless it will be understood that while the construction herein illustrated and described in detail provides a satisfactory embodiment of the invention, yet it forms but one of several possible physical adaptations which fall within the scope of the following claims.

I claim:

1. A fly swatter comprising: a molded blade member of flexible material having an inner end formed centrally and longitudinally thereof with an integral sheathing defining an internal wedge-shaped and resiliently expansible socket opening substantially at the inner end of said blade member and having forwardly converging top and bottom walls and side walls uniting said top and bottom walls; a lug formed on said bottom wall and projecting into said socket adjacent to the open end thereof; an elongated handle member comprising an integral molding formed at the forward end thereof with a longitudinally tapered, wedge-shaped tongue extension for close-fitting, frictional insertion into and in engagement with the internal wall surfaces of said socket, said tongue extension being of a size to resiliently expand the walls of said sheathing when inserted in said socket; and a positioning stop flange integrally formed with said handle member at the rear end of said extension for abutting engagement with the open end of said socket, said tongue extension being formed on one side thereof with a recess which, when the tongue extension is fully inserted into said socket with the flange of said handle member in engagement with the wall surfaces defining the open end of said socket, receives said lug to retain positively the blade and handle members in operatively united but detachable relationship, said tongue extension being formed on the side thereof opposite to that containing the lug-receiving recess, and slightly forward thereof, with a second recess to provide an air pocket, and a portion of the lug-receiving recess being of different curvature than the curvature of the corresponding portion of the lug to provide a space between the lug and tongue, said space and said second recess facilitating separation of the handle member from the sheathing.

2. A fly swatter comprising: a molded blade member of flexible material having an inner end formed centrally and longitudinally with an integral sheathing, the latter defining an internal wedge-shaped and resiliently expansible socket open at one end and composed of forwardly converging top and bottom walls and side walls uniting said top and bottom walls; a lug formed on said bottom wall and projecting into said socket intermediate the length thereof; an elongated handle member comprising an integral molding, said handle member being formed at the forward end thereof with a longitudinally projecting wedge-shaped tongue extension adapted for close-fitting frictional insertion into said socket, said tongue extension being of a size to resiliently expand the walls of said sheathing when said extension is inserted in said socket, said tongue extension being formed on one side thereof with a recess which, when the extension is fully inserted into said socket, receives said lug to retain positively the blade and handle members in operatively united but manually detachable relationship, said tongue extension being formed on the side thereof opposite to that containing the lug-receiving recess, and slightly forward thereof, with a second recess to provide an air pocket, and a portion of the lug-receiving recess being of different curvature than the curvature of the corresponding portion of the lug to provide a space between the lug and tongue, said space and said second recess facilitating separation of the handle member from the sheathing.

References Cited in the file of this patent

UNITED STATES PATENTS

| | | |
|---|---|---|
| Re. 19,152 | Schacht | May 1, 1934 |
| D. 167,658 | Roop | Sept. 2, 1952 |
| 490,831 | Lohers | Jan. 31, 1893 |
| 691,032 | Wiens | Jan. 14, 1902 |
| 1,161,654 | Gomber | Nov. 23, 1915 |
| 1,682,325 | D'amico | Aug. 28, 1928 |
| 2,651,878 | Webbeking | Sept. 15, 1953 |